(12) United States Patent
Reick et al.

(10) Patent No.: US 10,184,548 B2
(45) Date of Patent: Jan. 22, 2019

(54) POWER-SPLIT DRIVELINE FOR A WORK MACHINE

(71) Applicant: ZF Friedrichshafen AG, Friedrichshafen (DE)

(72) Inventors: Benedikt Reick, Friedrichshafen (DE); Raphael Himmelsbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 113 days.

(21) Appl. No.: 15/480,513

(22) Filed: Apr. 6, 2017

(65) Prior Publication Data

US 2017/0299021 A1   Oct. 19, 2017

(30) Foreign Application Priority Data

Apr. 13, 2016   (DE) .......................... 10 2016 206 204

(51) Int. Cl.
*F16H 3/72* (2006.01)
*B60K 17/356* (2006.01)
(Continued)

(52) U.S. Cl.
CPC ........... *F16H 3/728* (2013.01); *B60K 17/356* (2013.01); *F16H 37/10* (2013.01);
(Continued)

(58) Field of Classification Search
CPC ......... B60K 17/28; B60K 17/34; F16H 3/728; F16H 2200/201; F16H 2200/2005; F16H 2200/2007
See application file for complete search history.

(56) References Cited

U.S. PATENT DOCUMENTS

| 8,944,194 B2 | 2/2015 | Glaser et al. |
| 2005/0109549 A1* | 5/2005 | Morrow ................. B60K 6/365 180/65.245 |
| 2015/0072823 A1* | 3/2015 | Rintoo ................ F16H 61/0403 475/72 |

FOREIGN PATENT DOCUMENTS

| DE | 1 945 439 | 3/1971 |
| DE | 10 2005 044 181 A1 | 4/2007 |

(Continued)

OTHER PUBLICATIONS

German Search Report Corresponding to 10 2016 206 204.2 dated Feb. 2, 2017 (8 pages).

(Continued)

*Primary Examiner* — Mark J Beauchaine
(74) *Attorney, Agent, or Firm* — Davis & Bujold PLLC; Michael J. Bujold

(57) ABSTRACT

A power-split drive train for a working machine having a main drive element, drive output shafts (Ab1, Ab2, Ab3), and a continuous power-split transmission with three drive units (2a, 2b, 2c). The transmission enables all three output shafts to be operated at the same time with rotational speed variability. A first drive unit (2a) has two energy converters while second and third drive units (2b, 2c) each comprise one energy converter. All four energy converters are functionally connected to an electric line. The first unit (2a) is connected, via a first shaft, to the main drive element and, via a second shaft, to output shaft (Ab1). The first unit (2a) is connected to drive unit (2b) which is connected, via a third shaft, to output shaft (Ab2). The first drive unit (2a) is connected to drive unit (2c) which is connected, via a fourth shaft, to output shaft (Ab3).

15 Claims, 9 Drawing Sheets

(51) Int. Cl.
*F16H 37/10* (2006.01)
*F16H 37/08* (2006.01)

(52) U.S. Cl.
CPC .................. *F16H 2037/088* (2013.01); *F16H 2037/0866* (2013.01); *F16H 2200/201* (2013.01); *F16H 2200/2005* (2013.01); *F16H 2200/2007* (2013.01)

(56) References Cited

FOREIGN PATENT DOCUMENTS

DE  10 2013 224 383 A1  5/2015
FR         2 658 259 A1  8/1991

OTHER PUBLICATIONS

German Search Report Corresponding to 10 2016 206 205.0 dated Feb. 2, 2017 (8 pages).

* cited by examiner

|    | K1 | B1 | K2 |
|----|----|----|----|
| S1 | X  |    |    |
| S2 | X  |    | X  |
| S3 |    | X  |    |
| S4 |    | X  | X  |
| S5 |    |    | X  |
| S6 |    |    |    |

Fig. 17

|    | K1 | K2 |
|----|----|----|
| S1 | X  |    |
| S2 | X  | X  |
| S3 |    | X  |
| S4 |    |    |

Fig. 18

POWER-SPLIT DRIVELINE FOR A WORK MACHINE

This application claims priority from German patent application serial no. 10 2016 206 204.2 filed Apr. 13, 2016.

FIELD OF THE INVENTION

The invention relates to a power-split drive train for a working machine.

BACKGROUND OF THE INVENTION

Working machines, in particular agricultural machines, are increasingly constructed with continuously variable power-split transmissions. By virtue of using a continuously variable power-split transmission in combination with an appropriate driving strategy the efficiency, comfort and fuel consumption of working machines can be optimized. Furthermore, the automatic continuous adjustment of the transmission gear ratio enables a driver or operator of a working machine to concentrate more fully on the working process to be carried out by the machine, so that working processes can be implemented efficiently and in each case with higher productivity along with good process quality.

DE 10 2013 224 383 A1 describes a power-split axle drive for a vehicle. The power-split axle drive comprises a main drive element, a first additional drive element, a second additional drive element, a first vehicle axle, a second vehicle axle and a main transmission. Rotational movement or torque that can be produced by the main drive element can be introduced by way of a first shaft into the main transmission and/or the first additional drive element and by virtue of the rotational movement or torque of the main drive element at least the first vehicle axle can be driven by the main transmission. The power-split axle drive comprises a power-split transmission which is connected. via a second shaft, to the first vehicle axle and the main transmission, via a third shaft to the second additional drive element, and via a fourth shaft to the second vehicle axle. The second additional drive element acts upon the power-split transmission, whereby an offset of the second vehicle axle can be regulated.

SUMMARY OF THE INVENTION

The purpose of the present invention is to provide a power-split drive train for a working machine, which is in particular of simple design and has a compact structure.

This objective is achieved by the object of the preferred embodiments.

The power-split drive train for a working machine according to the invention comprises a main drive element, three variable-rotational-speed drive output shafts and a continuous power-split transmission with first, second and third additional drive units, the transmission being designed in order to enable rotational speed variability at the three drive output shafts, such that all three drive output shafts can be operated with rotational speed variability at the same time. Furthermore, the first additional drive unit has two energy converters, the second and third additional units each have one energy converter, and the four energy converters are connected, in particular functionally connected to one another at least by an electrically conducting line, wherein the main drive element is connected by way of a first shaft and the first drive output shaft is connected by a second shaft to the first additional drive unit, wherein further the first additional drive unit is connected at least indirectly to the second additional drive unit and is connected by way of the second additional drive unit and by a third shaft to the second drive output shaft, and wherein the first additional drive unit is connected at least indirectly to the third additional drive unit and by way of the third additional drive unit and a fourth shaft to the third drive output shaft. The two energy converters of the first additional drive unit form a variator. Thus, the first additional drive unit is in the form of a CVT (Continuously Variable Transmission). In particular, one of the two energy converters is provided for operation as a motor and the other energy converter is provided for operation as a generator or a pump.

In this context 'functionally connected' is understood to mean that the two elements can be connected directly to one another or that between two elements there are further elements, for example one or more spur gear stages.

In this context, moreover, 'power-split' is understood to mean that an input power is divided along more than one power branch. An indirect connection between the additional drive elements in understood to mean that the respective additional drive units are not connected to one another directly, i.e. immediately, but by way of transmission elements, in particular shafts, gearwheels or shifting elements. A connection between two transmission elements is made essentially in order to transmit torque and rotational movement from one transmission element to the other transmission element. Furthermore, an indirect connection between the additional drive units can also be formed via an energy-carrying line, in particular a hydraulic or electric line between the energy converters. Two shafts are preferably connected to one another by way of a spur gear pair.

The main drive element is preferably an internal combustion engine, for example a motor powered by gas, gasoline or diesel fuel. Alternatively however, the main drive element can also be in the form of an electric machine or a combination of an internal combustion engine of any type and an electric machine.

The first and second drive output shafts are vehicle axles of the working machine, which can be designed to be driven. Moreover, both the first drive output shaft and/or the second vehicle axle can be designed to be steerable. In particular, the first drive output shaft is designed as the rear axle and the second drive output shaft as the front axle. The third drive output shaft is designed to be an auxiliary drive output shaft and is designed in order to provide torque for the powering of working equipment or attachments.

In what follows, a shaft is not to be understood exclusively as, for example, a cylindrical transmission element mounted to rotate, provided for the transmission of torques and rotational speeds, but is rather understood to include connecting elements in general which connect individual components or elements to one another. In particular, a shaft of a planetary transmission is in the form of the sun gear, the ring gear or the web.

In a preferred embodiment, the first additional drive element, in addition to a first and a second energy converter, also comprises a planetary gearset, with the second energy converter of the first additional drive unit connected by a fifth shaft to the planetary gearset, the first energy converter of the first additional drive unit connected by a sixth shaft to the first shaft and with the first and second shafts connected to the planetary gearset. For further information about the arrangement and function of the respective transmission elements of the continuous power-split transmission, reference should be made to FIGS. 1, 5, 9, 13, 17 and 18 and to the associated figure descriptions.

According to another preferred embodiment the first additional drive unit, in addition to a first and a second energy converter, also comprises a planetary gearset, with the first energy converter of the first additional drive unit connected by a sixth shaft to the planetary gearset, the second energy converter of the first additional drive unit connected by a fifth shaft to the second shaft, and the first and second shafts connected to the planetary gearset. For further information about the arrangement and function of the respective transmission elements of the continuous power-split transmission, reference should be made to FIGS. 2, 6, 10, 14, 17 and 18 and to the associated figure descriptions.

In a further preferred embodiment, the first additional drive unit, in addition to a first and a second energy converter, also comprises a first and a second planetary gearset, with the second energy converter of the first additional drive unit connected by a fifth shaft to the second planetary gearset of the first additional drive unit, the first energy converter of the first additional drive unit connected by a sixth shaft to the first planetary gearset of the first additional drive unit and the first shaft connected to the first planetary gearset of the first additional drive unit, and with the first shaft connected to the first planetary gearset of the first additional drive unit and the second shaft connected to the second planetary gearset of the first additional drive unit, wherein the first planetary gearset of the first additional drive unit is connected by a twelfth shaft to the fifth shaft or to the second shaft, and wherein the second planetary gearset of the first additional drive unit is connected by an eleventh shaft to the sixth shaft or to the first shaft. In other words, four possibilities are proposed for coupling the twelfth shaft and the eleventh shaft to the first, second, fifth and sixth shaft. Preferably, the first planetary gearset of the first additional drive unit is connected by way of the twelfth shaft to the second shaft, whereas the second planetary gearset of the first additional drive unit is connected by the eleventh shaft to the first shaft. Preferably, the first planetary gearset of the first additional drive unit is connected by the twelfth shaft to the fifth shaft, whereas the second planetary gearset of the first additional drive unit is connected by the eleventh shaft to the first shaft W1. Also preferably, the first planetary gearset of the first additional drive unit is connected by the twelfth shaft to the second shaft, whereas the second planetary gearset of the first additional drive unit is connected by the eleventh shaft to the sixth shaft. It is also preferred that the first planetary gearset of the first additional drive unit is connected by the twelfth shaft to the fifth shaft, whereas the second planetary gearset of the first additional drive unit is connected by the eleventh shaft to the sixth shaft.

According to another preferred embodiment, the two energy converters of the first additional drive unit are only connected to one another by the conducting line, whereas the first energy converter of the first additional drive unit is connected to the first shaft and the second energy converter of the first additional drive unit is connected to the second shaft. For further information about the arrangement and function of the respective transmission elements of the continuous power-split transmission, reference should be made to FIGS. 4, 8, 12, 16, 17 and 18 and to the associated figure descriptions.

Preferably, the energy converter of the second additional drive unit is connected by way of the third shaft to the second drive output shaft. For further information about the arrangement and function of the respective transmission elements of the continuous power-split transmission, reference should be made to FIGS. 1 to 4, 9 to 12, and 17 and 18 and to the associated figure descriptions.

Preferably the second additional drive unit, in addition to the energy converter, also comprises a planetary gearset, with the energy converter of the second additional drive unit connected by an eighth shaft to the planetary gearset, the second drive output shaft Ab2 connected to the planetary gearset by a third shaft and a seventh shaft, which is connected to the second shaft, connected to the planetary gearset. Thus, the second additional drive unit is designed as a CVU (Continuously Variable Unit) and comprises an energy converter with a conducting line and a planetary gearset with three shafts. In particular, the seventh shaft and the third shaft can be coupled to one another by means of a shifting element. A shifting element is understood to be a device having at least an open and a closed condition, such that in its open condition the device cannot transmit any torque whereas in its closed condition the device can transmit a torque between two other devices which cooperate with the device or shifting element. The shifting element concerned can be both a powershift element, particularly a friction clutch, and also an interlocking element, in particular a claw clutch. For further information about the arrangement and function of the respective transmission elements of the continuous power-split transmission, reference should be made to FIGS. 5 to 8 and 13 to 18 and to the associated figure descriptions.

Preferably, the energy converter of the third additional drive unit is connected by the fourth shaft to the third drive output shaft. For further information about the arrangement and function of the respective transmission elements of the continuous power-split transmission, reference should be made to FIGS. 9 to 16 and 18 and to the associated figure descriptions.

Also preferably, the third additional drive unit, in addition to the energy converter, also comprises a planetary gearset and the energy converter of the third additional drive unit is connected by way of a tenth shaft to the planetary gearset, the third drive output shaft is connected by a fourth shaft to the planetary gearset, and a ninth shaft, which is connected to the first shaft, is connected to the planetary gearset. Thus, the third additional drive unit is designed as a CVU and comprises an energy converter with a conducting line and a planetary gearset with three shafts. In particular, the ninth shaft and the fourth shaft can be coupled to one another by means of a first shifting element of the third additional drive unit. Also preferably, the fourth shaft can be held fixed onto a housing 7 by means of a second shifting element. Thus, the second shifting element of the third additional drive unit is in the form of a brake. A brake is preferably understood to mean a friction shifting element connected on one side to a static element, namely the housing, and on the other side to an element that can rotate, namely the fourth shaft. As a rule an actuator then applies a force at the point of connection, thereby producing a friction force by means of which, for example, rotational movement of the rotating component is buttressed against the static component and the rotational movement is thereby impeded or prevented. The actuator for actuating the shifting element can be designed to be activated hydraulically, electromechanically, electromagnetically or for example even pneumatically.

Preferably the four energy converters are designed to be operated electrically, and the conducting line then has an interface for the delivery and/or uptake of electric power. In particular the line is designed to conduct electrical energy between the energy converters. Preferably the interface is connected to an energy source and makes it possible to feed electrical energy directly to the energy converter concerned. In particular the interface is connected to a mains connection and feeds electrical energy in or out by way of the same.

Also preferably, the conducting line is connected at least indirectly to an energy storage device. 'Indirectly' is understood to mean that between the line and the energy storage device there can be arranged some other, preferably electric element. However, it is also conceivable that the energy storage device is connected directly to the line. The energy storage device is preferably in the form of an accumulator and is designed to store the electrical energy generated by the energy converters, and/or to deliver stored electrical energy to the energy converters or to other consumers. The power balance of the energy converters must not be equalized.

BRIEF DESCRIPTION OF THE DRAWINGS

Below, sixteen example embodiments of the invention are explained in more detail with reference to eighteen drawings, which show:

FIG. 17: A shifting matrix for the power-split drive trains according to FIGS. 1 to 8, and FIG. 18: A shifting matrix for the power-split drive trains according to FIGS. 9 to 16.

DETAILED DESCRIPTION OF THE PREFERRED EMBODIMENTS

Figure 1:
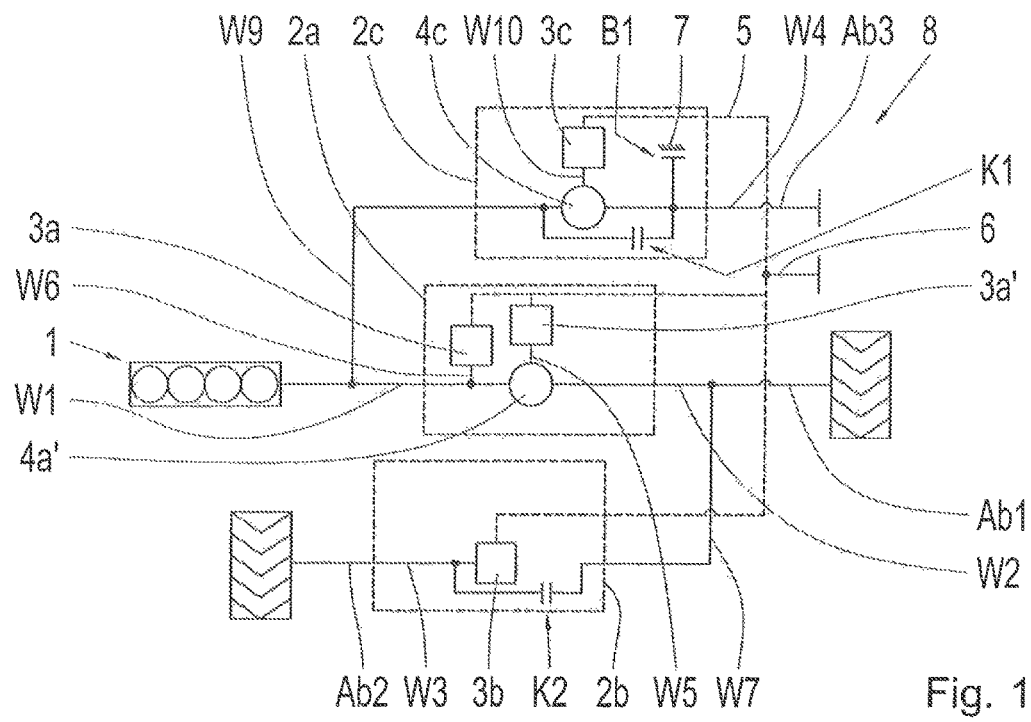
FIG. 1: A schematic representation of a first embodiment of a power-split drive train according to the invention.

According to FIGS. 1 to 16 a power-split drive train according to the invention for a working machine—not shown here—comprises a main drive input element 1, three rotational-speed-variable drive output shafts Ab1, Ab2, Ab3, and a continuously variable power-split transmission 8. The transmission 8 comprises a first, second and third additional drive unit 2a, 2b, 2c and is designed to enable rotational speed variability at the three drive output shafts Ab1, Ab2, Ab3. The first additional drive unit 2a comprises a first and a second energy converter 3a, 3a', whereas the second and third additional drive units each comprise one respective energy converter 3b, 3c. The total of four energy converters 3a, 3a', 3b, 3c are functionally connected to one another by an electrically conducting line 5. The main drive input element 1 is connected by a first shaft W1 to the first additional drive unit 2a and the first drive output shaft Ab1 is connected to the first additional drive unit 2a by a second shaft W2. In addition, the first additional drive unit 2a is connected by a seventh shaft W7 to the second additional drive unit 2b and to the second drive output shaft Ab2 by way of the second additional drive unit 2b and by a third shaft W3. Furthermore, the first additional drive unit 2a is connected by a ninth shaft W9 to the third additional drive unit 2c and by way of the third additional drive unit 2c and a fourth shaft W4 to the third drive output shaft Ab3.

According to FIG. 1, in addition to the two energy converters 3a, 3a' the first additional drive unit 2a also comprises a second planetary gearset 4a' and the second energy converter 3a' of the first additional drive unit 2a is connected by a fifth shaft W5 to the second planetary gearset 4a' of the first additional drive unit 2a. In addition, the first energy converter 3a of the first additional drive unit 2a is connected by a sixth shaft W6 to the first shaft W1. The first and second shafts W1 and W2 are connected to the first planetary gearset 4a' of the first additional drive unit 2a. The energy converter 3b of the second additional drive unit 2b is connected by a third shaft W3 to the second drive output shaft Ab2. The seventh shaft W7 and the third shaft W3 can be coupled to one another by a shifting element K2 of the second additional drive unit 2b. Moreover, in addition to the energy converter 3c the third additional drive unit 2c also comprises a planetary gearset 4c and the energy converter 3c of the third additional drive unit 2c is connected to the planetary gearset 4c by a tenth shaft W10. The third drive output shaft Ab3 is connected to the planetary gearset 4c by way of the fourth shaft W4. In addition the ninth shaft W9 is connected to the planetary gearset 4c. The ninth shaft W9 and the fourth shaft W4 can be coupled to one another by means of a first shifting element K1 of the third additional drive unit 2c, and the fourth shaft W4 can be held fixed on a housing 7 by means of a second shifting element B1 of the third additional drive unit 2c.

Figure 2:
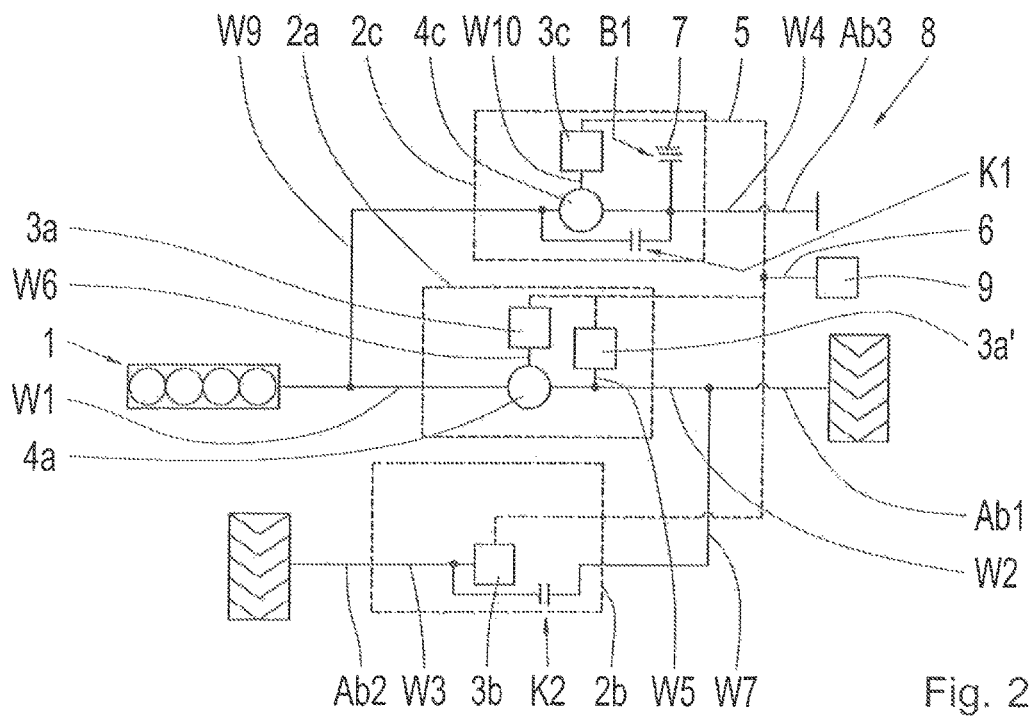
FIG. 2: A schematic representation of a second embodiment of a power-split drive train according to the invention.

FIG. 2 shows a schematic representation of a second embodiment of the power-split drive train 1. This differs from the embodiment shown in FIG. 1 essentially in the design of the first additional drive unit 2a. In addition to the two energy converters 3a, 3a', the first additional drive unit 2a also comprises a first planetary gearset 4a and the first energy converter 3a of the first additional drive unit 2a is connected by a sixth shaft W6 to the first planetary gearset 4a of the first additional drive unit 2a. The second energy converter 3a' of the first additional drive unit 2a is connected by way of a fifth shaft W5 to the second shaft W2. The first and second shafts W1 and W2 are connected to the first planetary gearset 4a of the first additional drive unit 2a. In addition, by way of the interface 6 an energy storage device 9 is connected to the line 5 and thus to the energy converter 3a, 3a', 3b, 3c concerned. The energy storage device 9 is only shown in this embodiment but can be present in any embodiment of the invention. In other respects the embodiment shown in FIG. 2 corresponds to the embodiment described in FIG. 1.

Figure 3:
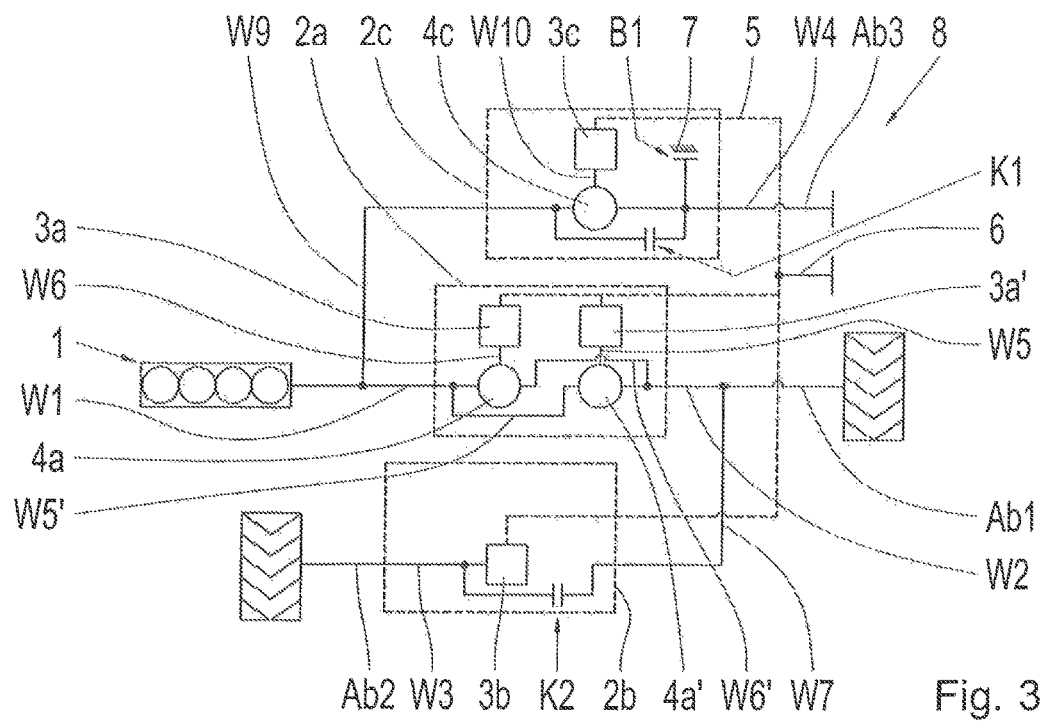
FIG. 3: A schematic representation of a third embodiment of a power-split drive train according to the invention.

FIG. 3 shows a schematic representation of a third embodiment of the power-split drive train 1. This differs from the embodiment shown in FIG. 1 essentially in the design of the first additional drive unit 2a. In addition to the two energy converters 3a, 3a', the first additional drive unit 2a also comprises two planetary gearsets 4a, 4a'. The second energy converter 3a' of the first additional drive unit 2a is connected by a fifth shaft W5 to the second planetary gearset 4a' of the first additional drive unit 2a. In addition, the first energy converter 3a of the first additional drive unit 2a is connected by a sixth shaft W6 to the first planetary gearset 4a of the first additional drive unit 2a. The first shaft W1 is connected to the first planetary gearset 4a of the first additional drive unit 2a and the second shaft W2 is connected to the second planetary gearset 4a' of the first additional drive unit 2a. Moreover, the first planetary gearset 4a of the first additional drive unit 2a is connected by a twelfth shaft W6' to the second shaft W2 whereas the second planetary gearset 4a' of the first additional drive unit 2a is connected by an eleventh shaft W5' to the first shaft W1. In other respects the embodiment shown in FIG. 3 corresponds to the embodiment described in FIG. 1.

Figure 4:
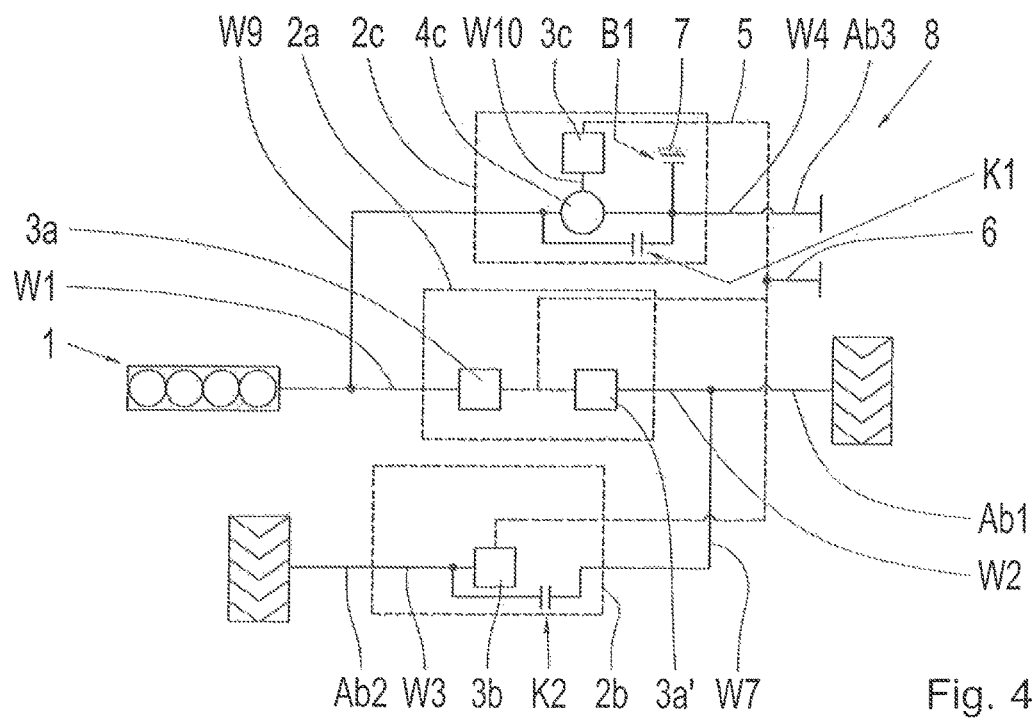
FIG. 4: A schematic representation of a fourth embodiment of a power-split drive train according to the invention.

FIG. 4 shows a schematic representation of a fourth embodiment of the power-split drive train 1. This differs from the embodiment shown in FIG. 1 essentially in the design of the first additional drive unit 2a. The two energy converters 3a, 3a' of the first additional drive unit 2a are connected to one another only by the line 5, with the first energy converter 3a of the first additional drive unit 2a connected to the first shaft W1 and the second energy converter 3a' of the first additional drive unit 2a connected to the second shaft W2. Thus, the two energy converters 3a, 3a' of the first additional drive unit 2a are not connected to one another by shafts and/or planetary gearsets. In other respects the embodiment shown in FIG. 4 corresponds to the embodiment described in FIG. 1.

Figure 5:
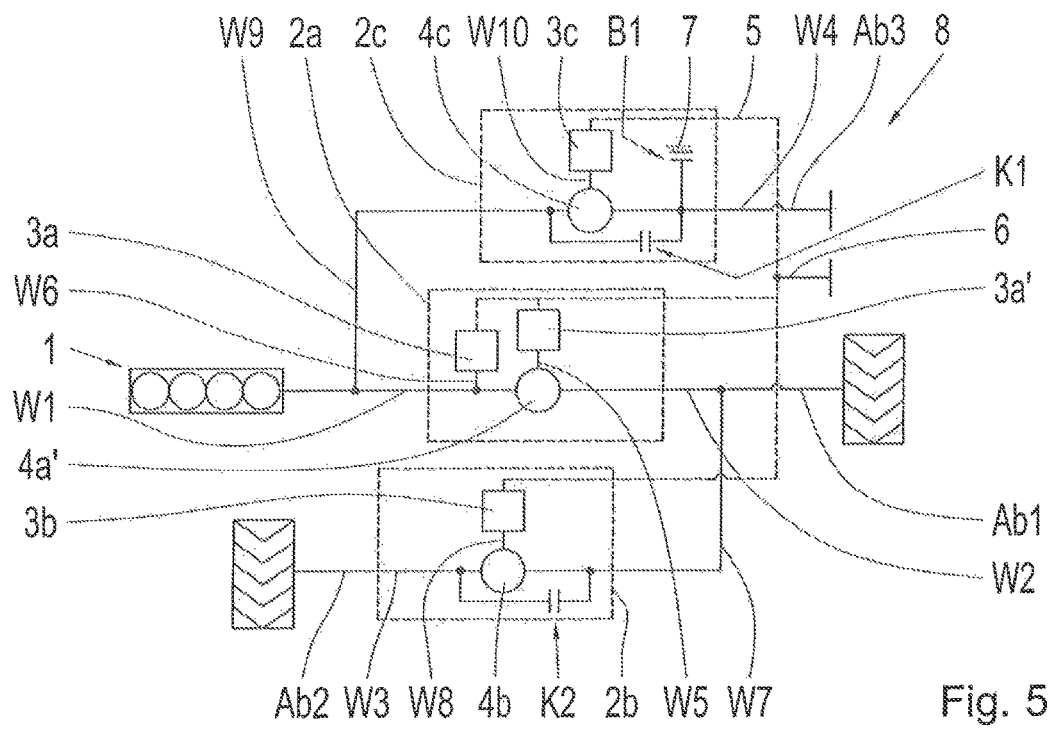
FIG. 5: A schematic representation of a fifth embodiment of a power-split drive train according to the invention.

FIG. 5 shows a schematic representation of a fifth embodiment of the power-split drive train 1. According to FIG. 5, in addition to the two energy converters 3a, 3a' the first additional drive unit 2a also comprises a second planetary gearset 4a' of the first additional drive unit 2a, with the second energy converter 3a' of the first additional drive unit 2a connected by a fifth shaft W5 to the second planetary gearset 4a'. Moreover, the first energy converter 3a of the first additional drive unit 2a is connected to the first shaft W1 by a sixth shaft W6. The first and second shafts W1 and W2 are connected to the second planetary gearset 4a' of the first additional drive unit 2a. The second additional drive unit 2b, in addition to the energy converter 3b, also comprises a planetary gearset 4b and the energy converter 3b of the second additional drive unit 2b is connected to the planetary gearset 4b by an eighth shaft W8. The second drive output shaft Ab2 is connected to the planetary gearset 4b by the third shaft W3. The seventh shaft W7 and the third shaft W3 can be coupled to one another by means of a shifting element K2 of the second additional drive unit 2b. Furthermore, in addition to the energy converter 3c the third additional drive unit 2c also comprises a planetary gearset 4c and the energy converter 3c of the third additional drive unit 2c is connected by a tenth shaft W10 to the planetary gearset 4c. The third drive output shaft Ab3 is connected to the planetary gearset 4c by the fourth shaft W4. In addition, the ninth shaft W9 is connected to the planetary gearset 4c. The ninth shaft W9 and the fourth shaft W4 can be coupled to one another by means of a first shifting element K1 of the third additional drive unit 2c and the fourth shaft W4 can be held fast onto a housing 7 by a second shifting element B1 of the third additional drive unit 2c.

Figure 6:
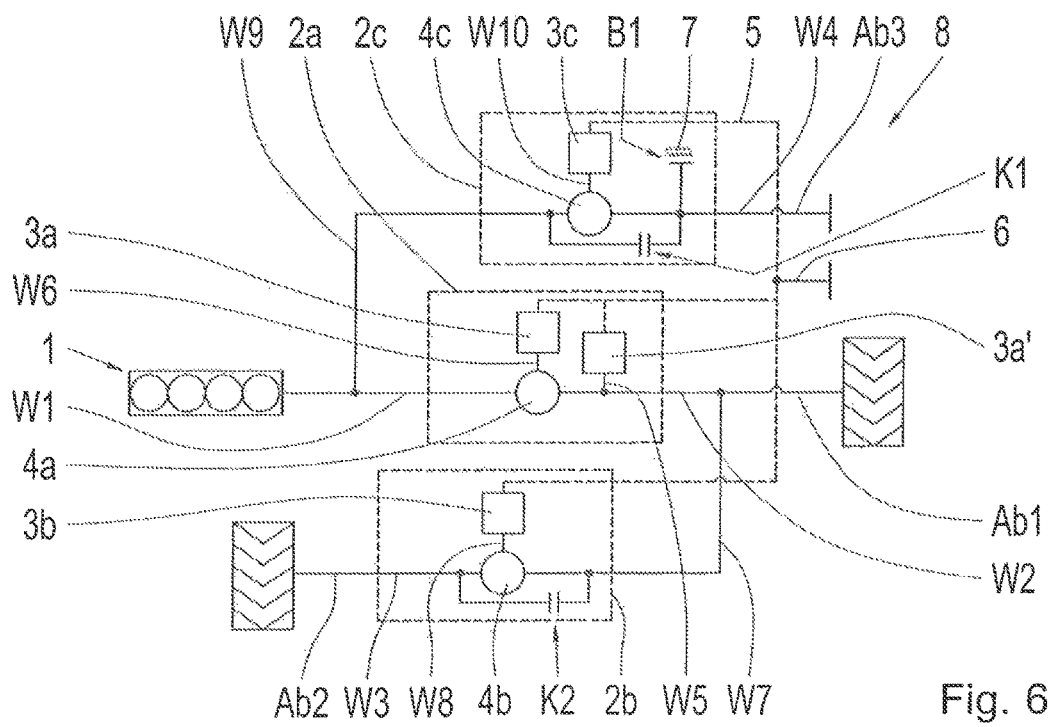
FIG. 6: A schematic representation of a sixth embodiment of a power-split drive train according to the invention.

FIG. 6 shows a schematic representation of a sixth embodiment of the power-split drive train 1. This differs from the embodiment shown in FIG. 5 essentially in the design of the first additional drive unit 2a. In addition to the two energy converters 3a, 3a', the first additional drive unit 2a also comprises a first planetary gearset 4a of the first additional drive unit 2a, with the first energy converter 3a of the first additional drive unit 2a connected to the first planetary gearset 4a of the first additional drive unit 2a by a sixth shaft W6. The second energy converter 3a' of the first additional drive unit 2a is connected to the second shaft W2 by a fifth shaft W5. The first and second shafts W1 and W2 are connected to the first planetary gearset 4a of the first additional drive unit 2a. In addition an energy storage device 9 is connected by way of an electrical interface 6 to the electric line 5 and thus to the energy converter 3a, 3a', 3b, 3c concerned. In other respects the embodiment shown in FIG. 6 corresponds to the embodiment described in FIG. 5.

Figure 7:
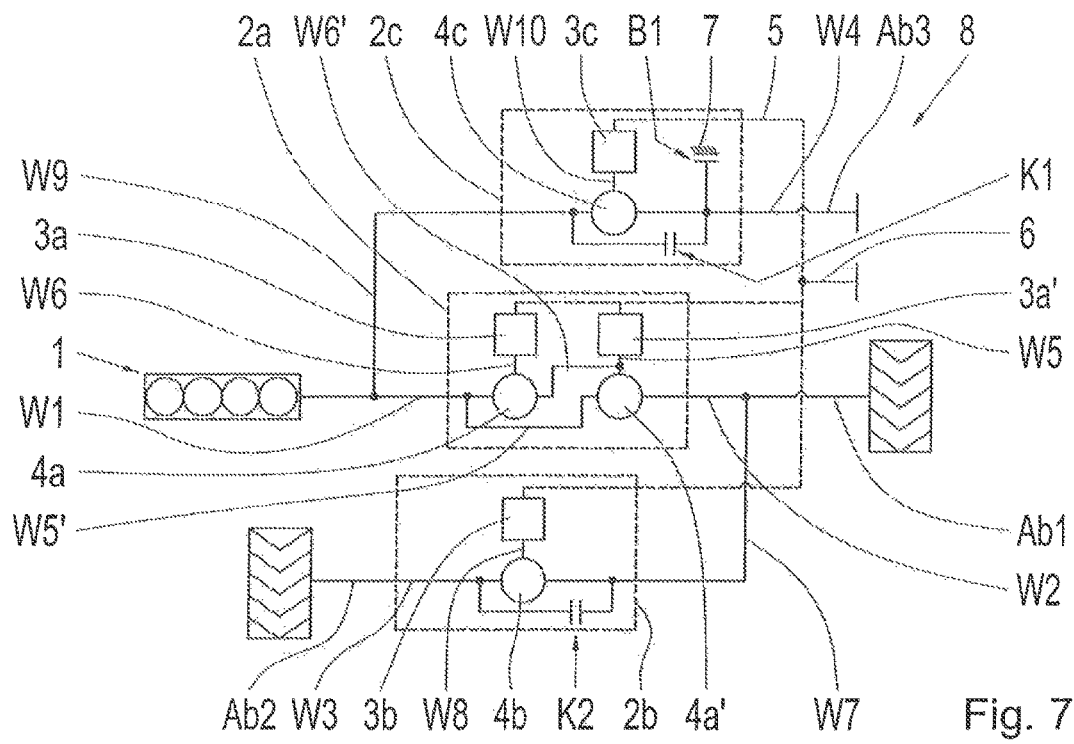
FIG. 7: A schematic representation of a seventh embodiment of a power-split drive train according to the invention.

FIG. 7 shows a schematic representation of a seventh embodiment of the power-split drive train 1. This differs from the embodiment shown in FIG. 5 essentially in the design of the first additional drive unit 2a. In addition to the two energy converters 3a, 3a', the first additional drive unit 2a also comprises two planetary gearsets 4a, 4a'. The second energy converter 3a' of the first additional drive unit 2a is connected by a fifth shaft W5 to the second planetary gearset 4a' of the first additional drive unit 2a. Furthermore, the first energy converter 3a of the first additional drive unit 2a is connected by a sixth shaft W6 to the first planetary gearset 4a of the first additional drive unit 2a. The first shaft W1 is connected to the first planetary gearset 4a of the first additional drive unit 2a and the second shaft W2 is connected to the second planetary gearset 4a' of the first additional drive unit 2a. In addition the first planetary gearset 4a of the first additional drive unit 2a is connected by a twelfth shaft W6' to the fifth shaft W5, and the second planetary gearset 4a' of the first additional drive unit 2a is connected by an eleventh shaft W5' to the first shaft W1. In other respects the embodiment shown in FIG. 7 corresponds to the embodiment described in FIG. 5.

Figure 8:
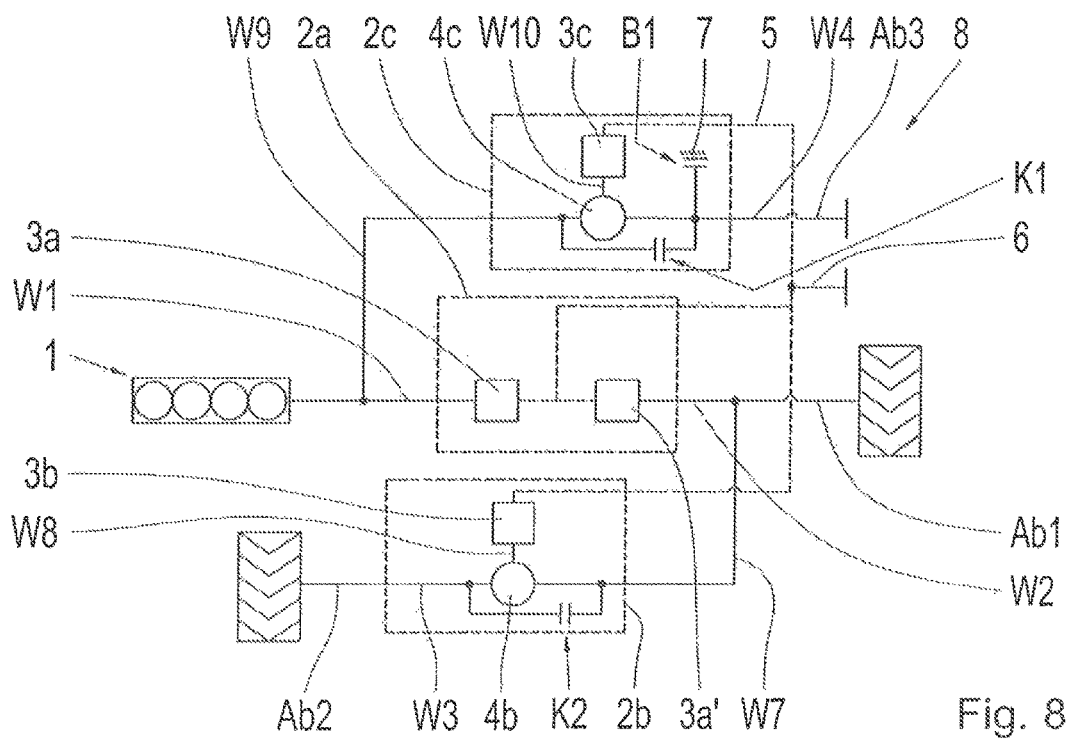
FIG. 8: A schematic representation of an eighth embodiment of a power-split drive train according to the invention.

FIG. 8 shows a schematic representation of an eighth embodiment of the power-split drive train 1. This differs from the embodiment shown in FIG. 5 essentially in the design of the first additional drive unit 2a. The two energy converters 3a, 3a' of the first additional drive unit 2a are only connected to one another by the electrically conducting line 5, whereas the first energy converter 3a of the first additional drive unit 2a is connected to the first shaft W1 while the second energy converter 3a' of the first additional drive unit 2a is connected to the second shaft W2. Thus, the two energy converters 3a, 3a' are not connected to one another by way of shafts and/or planetary gearsets. In other respects the embodiment shown in FIG. 8 corresponds to the embodiment described in FIG. 5.

Figure 9:
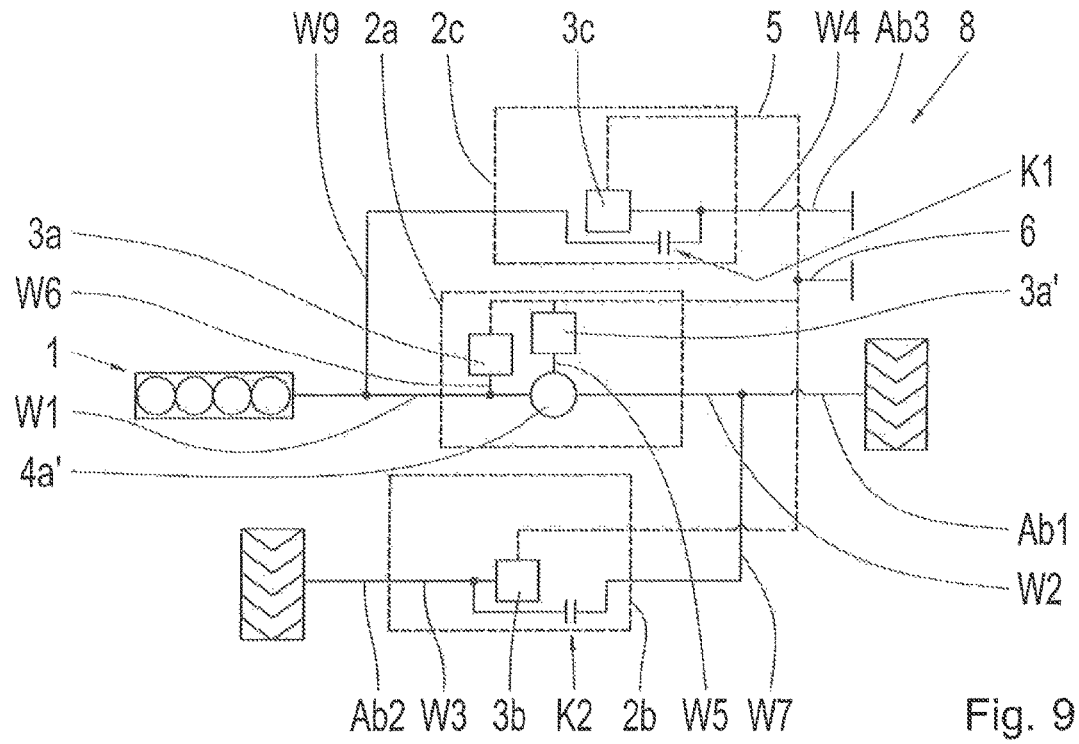
FIG. 9: A schematic representation of a ninth embodiment of a power-split drive train according to the invention.

FIG. 9 shows a schematic representation of a ninth embodiment of the power-split drive train 1. According to FIG. 9, in addition to the two energy converters 3a, 3a' the first additional drive unit 2a also comprises a second planetary gearset 4a', and the second energy converter 3a' of the first additional drive unit 2a is connected by a fifth shaft W5 to the second planetary gearset 4a' of the first additional drive unit 2a. Furthermore, the first energy converter 3a of the first additional drive unit 2a is connected by a sixth shaft W6 to the first shaft W1. The first and second shafts W1 and W2 are connected to the second planetary gearset 4a' of the first additional drive unit 2a. The energy converter 3b of the second additional drive unit 2b is connected by a third shaft W3 to the second drive output shaft Ab2. The seventh shaft W7 and the third shaft W3 can be coupled to one another by means of a shifting element K2 of the second additional drive unit 2b. In addition the energy converter 3c of the third additional drive unit 2c is connected by the fourth shaft W4 to the third drive output shaft Ab3. The ninth shaft W9 and the fourth shaft W4 can be coupled to one another by means of a first shifting element K1 of the third additional drive unit 2c.

Figure 10:
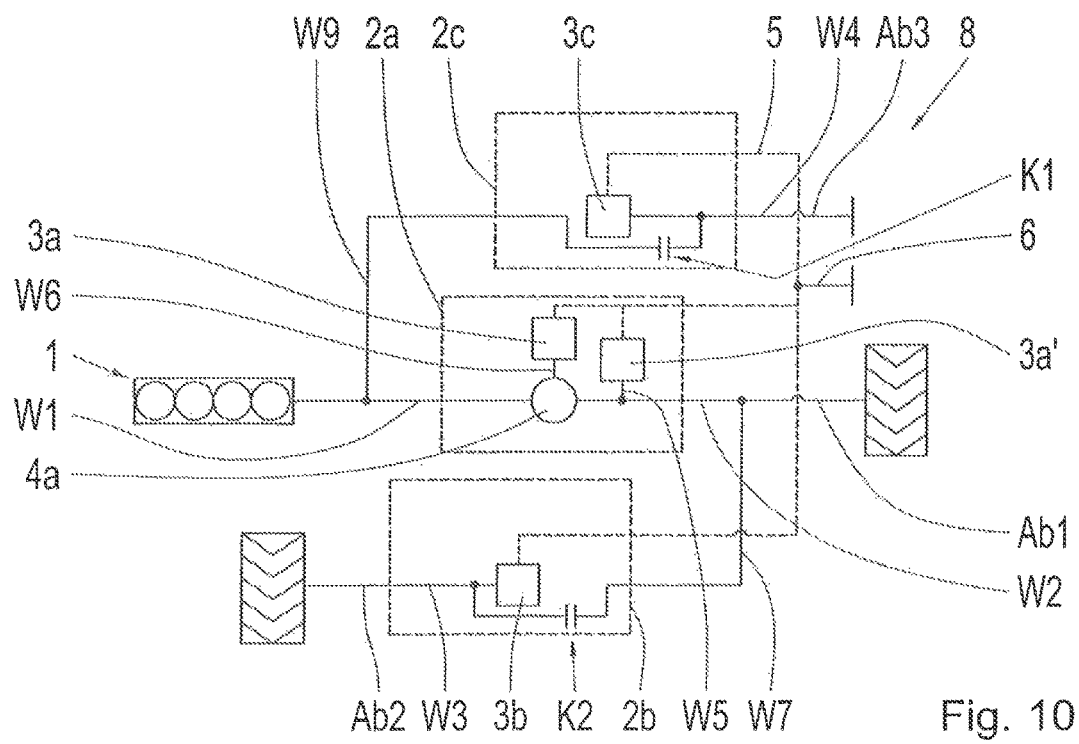
FIG. 10: A schematic representation of a tenth embodiment of a power-split drive train according to the invention.

FIG. 10 shows a schematic representation of a tenth embodiment of the power-split drive train 1. This differs from the embodiment shown in FIG. 9 essentially in the design of the first additional drive unit 2a. In addition to the two energy converters 3a, 3a', the first additional drive unit 2a also comprises a first planetary gearset 4a, with the first energy converter 3a of the first additional drive unit 2a connected to the first planetary gearset 4a of the first additional drive unit 2a by a sixth shaft W6. The second energy converter 3a' of the first additional drive unit 2a is connected to the second shaft W2 by a fifth shaft W5. The first and second shafts W1 and W2 are connected to the first planetary gearset 4a of the first additional drive unit 2a. In addition, by way of the electric interface 6 an energy storage device 9 is connected to the electric line 5 and thus to the respective energy converter 3a, 3a', 3b, 3c concerned. In other respects the embodiment shown in FIG. 10 corresponds to the embodiment described in FIG. 9.

Figure 11:
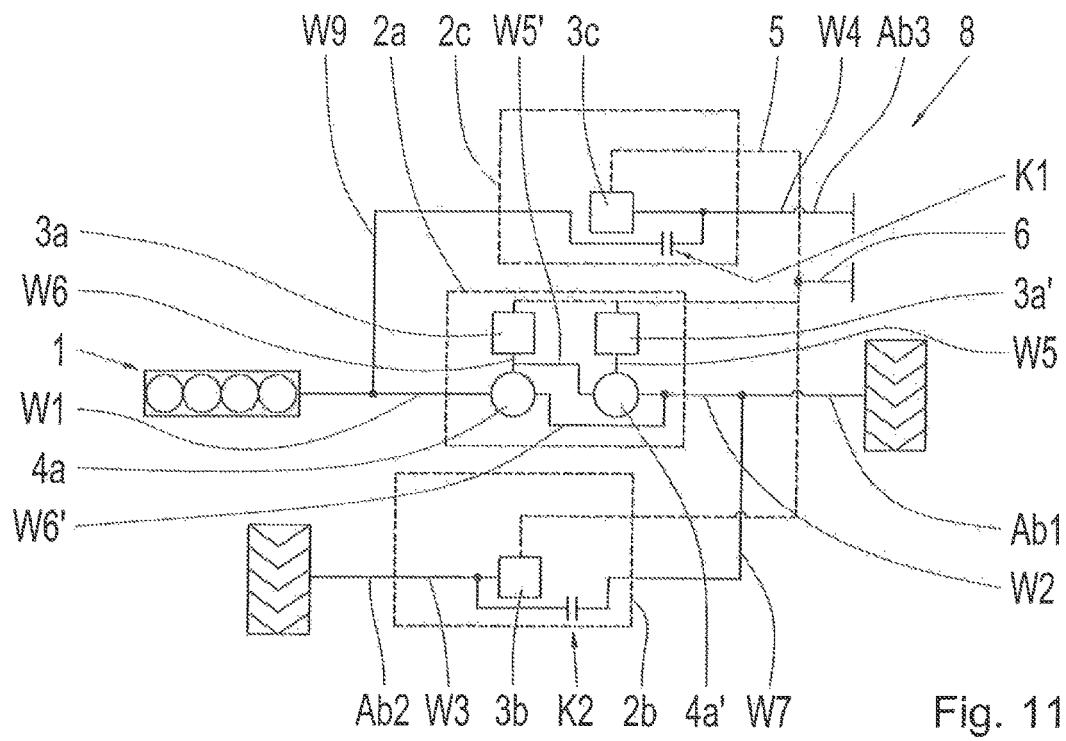
FIG. 11: A schematic representation of an eleventh embodiment of a power-split drive train according to the invention.

FIG. 11 shows a schematic representation of an eleventh embodiment of the power-split drive train 1. This differs from the embodiment shown in FIG. 9 essentially in the design of the first additional drive unit 2a. In addition to the two energy converters 3a, 3a', the first additional drive unit 2a also comprises two planetary gearsets 4a, 4a'. The second energy converter 3a' of the first additional drive unit 2a is connected by a fifth shaft W5 to the second planetary gearset 4a' of the first additional drive unit 2a. Moreover, the first energy converter 3a of the first additional drive unit 2a is connected by a sixth shaft W6 to the first planetary gearset 4a of the first additional drive unit 2a. The first shaft W1 is connected to the first planetary gearset 4a of the first additional drive unit 2a and the second shaft W2 is connected to the second planetary gearset 4a' of the first additional drive unit 2a. In addition the first planetary gearset 4a of the first additional drive unit 2a is connected by a twelfth shaft W6' to the second shaft W2 whereas the second planetary gearset 4a' of the first additional drive unit 2a is connected by an eleventh shaft W5' to the sixth shaft W6. In other respects the embodiment shown in FIG. 11 corresponds to the embodiment described in FIG. 9.

Figure 12:
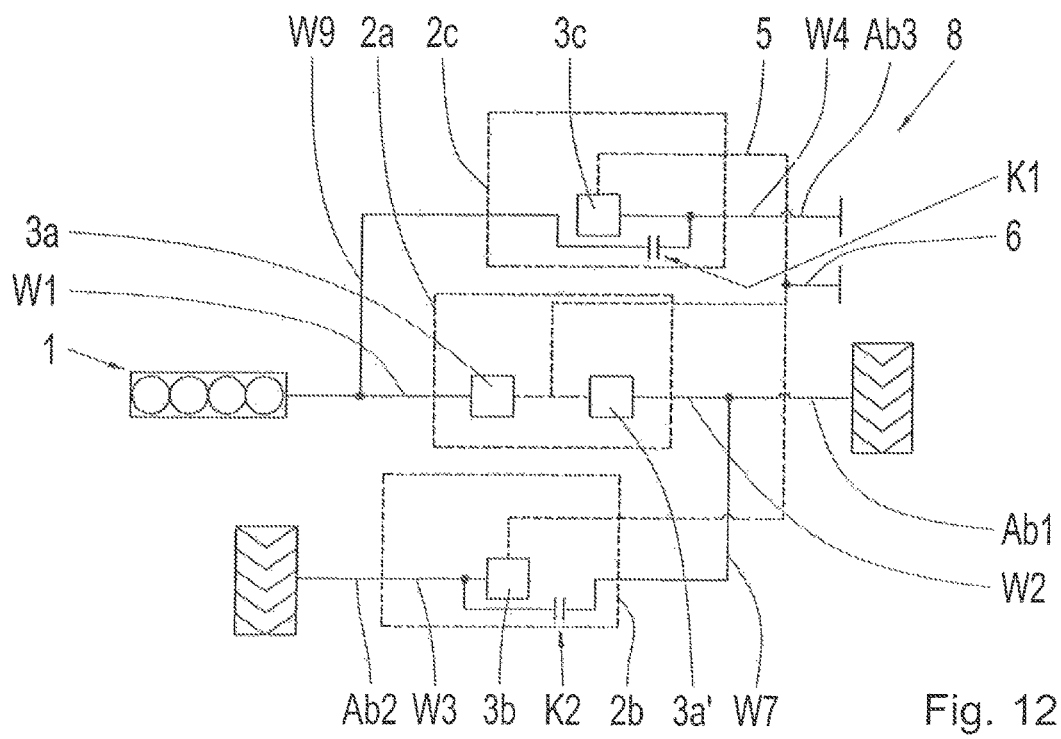
FIG. 12: A schematic representation of a twelfth embodiment of a power-split drive train according to the invention.

FIG. 12 shows a schematic representation of a twelfth embodiment of the power-split drive train 1. This differs from the embodiment shown in FIG. 9 essentially in the design of the first additional drive unit 2a. The two energy converters 3a, 3a' of the first additional drive unit 2a are connected to one another only be the electric line 5, and the first energy converter 3a of the first additional drive unit 2a is connected to the first shaft W1 whereas the second energy converter 3a' of the first additional drive unit 2a is connected to the second shaft W2. Thus, the two energy converters 3a, 3a' of the first additional drive unit 2a are not connected to one another by shafts and/or planetary gearsets. In other respects the embodiment shown in FIG. 12 corresponds to the embodiment described in FIG. 9.

Figures 13, 14:
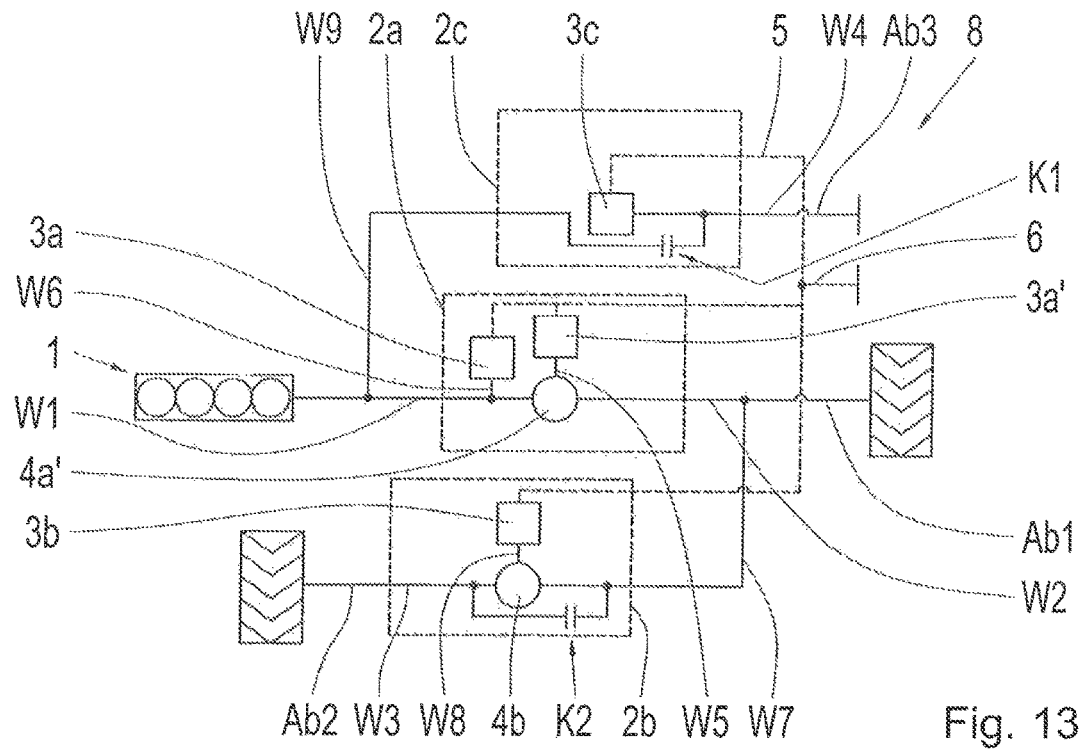
FIG. 13: A schematic representation of a thirteenth embodiment of a power-split drive train according to the invention.
FIG. 14: A schematic representation of a fourteenth embodiment of a power-split drive train according to the invention.

FIG. 13 shows a schematic representation of a thirteenth embodiment of the power-split drive train 1. According to FIG. 13, in addition to the two energy converters 3a, 3a' the first additional drive unit 2a also comprises a second planetary gearset 4a', and the second energy converter 3a' of the first additional drive unit 2a is connected by a fifth shaft W5 to the second planetary gearset 4a' of the first additional drive unit 2a. Furthermore, the first energy converter 3a of the first additional drive unit 2a is connected to the first shaft W1 by a sixth shaft W6. The first and second shafts W1 and W2 are connected to the second planetary gearset 4a' of the first additional drive unit 2a. The second additional drive unit 2b, in addition to the energy converter 3b, also comprises planetary gearset 4b and the energy converter 3b of the second additional drive unit 2b is connected by an eighth shaft W8 to the planetary gearset 4b. The second drive output shaft Ab2 is connected by way of the third shaft W3 to the planetary gearset 4b. In addition the seventh shaft W7 is connected to the planetary gearset 4b. The seventh shaft W7 and the third shaft W3 can be coupled to one another by means of a shifting element K2 of the second additional drive unit 2b. Moreover, the energy converter 3c of the third additional drive unit 2c is connected by the fourth shaft W4 to the third drive output shaft Ab3. The ninth shaft W9 and the fourth shaft W4 can be coupled to one another by means of a first shifting element K1 of the third additional drive unit 2c.

FIG. 14 shows a schematic representation of a fourteenth embodiment of the power-split drive train 1. This differs from the embodiment shown in FIG. 13 essentially in the design of the first additional drive unit 2a. In addition to the two energy converters 3a, 3a', the first additional drive unit 2a also comprises a planetary gearset 4a and the first energy converter 3a of the first additional drive unit 2a is connected by a sixth shaft W6 to the first planetary gearset 4a of the first additional drive unit 2a. The second energy converter 3a' of the first additional drive unit 2a is connected by a fifth shaft W5 to the second shaft W2. The first and second shafts W1 and W2 are connected to the first planetary gearset 4a of the first additional drive unit 2a. In addition, an energy storage device 9 is connected by way of the electrical interface 6 to the electric line 5 and thus to the respective energy converter 3a, 3a', 3b, 3c concerned. In other respects the embodiment shown in FIG. 14 corresponds to the embodiment described in FIG. 13.

Figure 15:
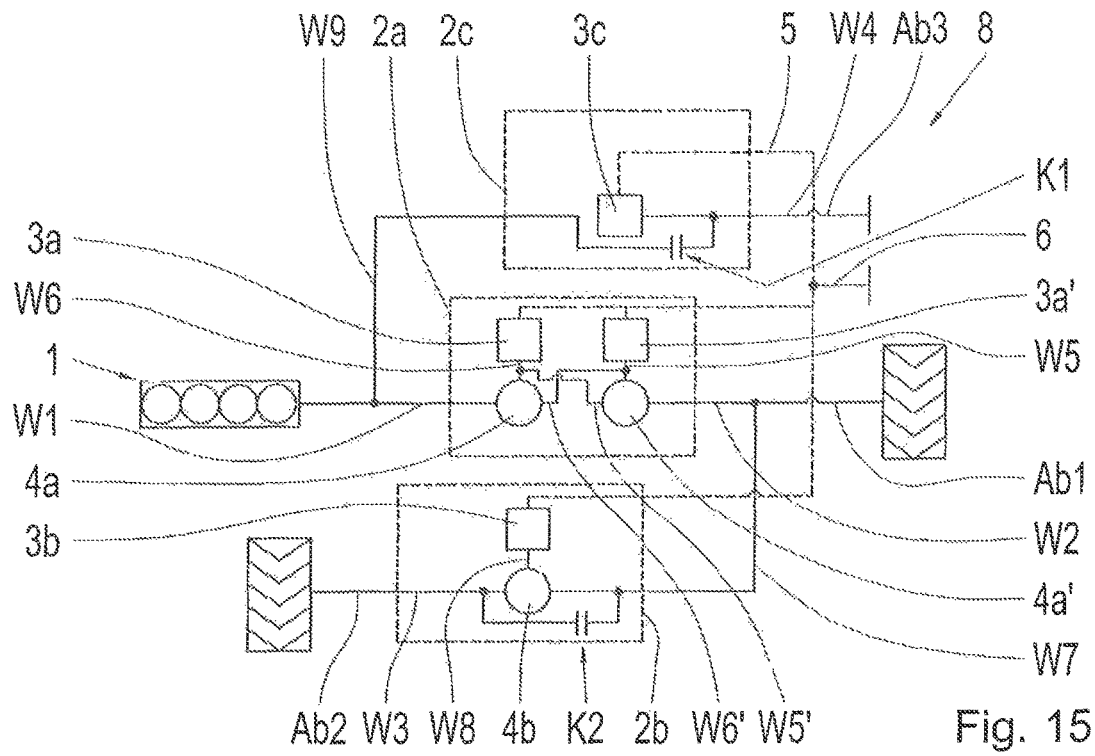
FIG. 15: A schematic representation of a fifteenth embodiment of a power-split drive train according to the invention.

FIG. 15 shows a schematic representation of a fifteenth embodiment of the power-split drive train 1. This differs from the embodiment shown in FIG. 13 essentially in the design of the first additional drive unit 2a. In addition to the two energy converters 3a, 3a', the first additional drive unit 2a also comprises two planetary gearsets 4a, 4a'. The second energy converter 3a' of the first additional drive unit 2a is connected by a fifth shaft W5 to the second planetary gearset 4a' of the first additional drive unit 2a. Furthermore, the first energy converter 3a of the first additional drive unit 2a is connected by a sixth shaft W6 to the first planetary gearset 4a of the first additional drive unit 2a. The first shaft W1 is connected to the first planetary gearset 4a of the first additional drive unit 2a and the second shaft W2 is connected to the second planetary gearset 4a' of the first additional drive unit 2a. Moreover, the first planetary gearset 4a of the first additional drive unit 2a is connected by a twelfth shaft W6' to the fifth shaft W5, and the second planetary gearset 4a' of the first additional drive unit 2a is connected by an eleventh shaft W5' to the sixth shaft W6. In other respects the embodiment shown in FIG. 15 corresponds to the embodiment described in FIG. 13.

Figure 16:
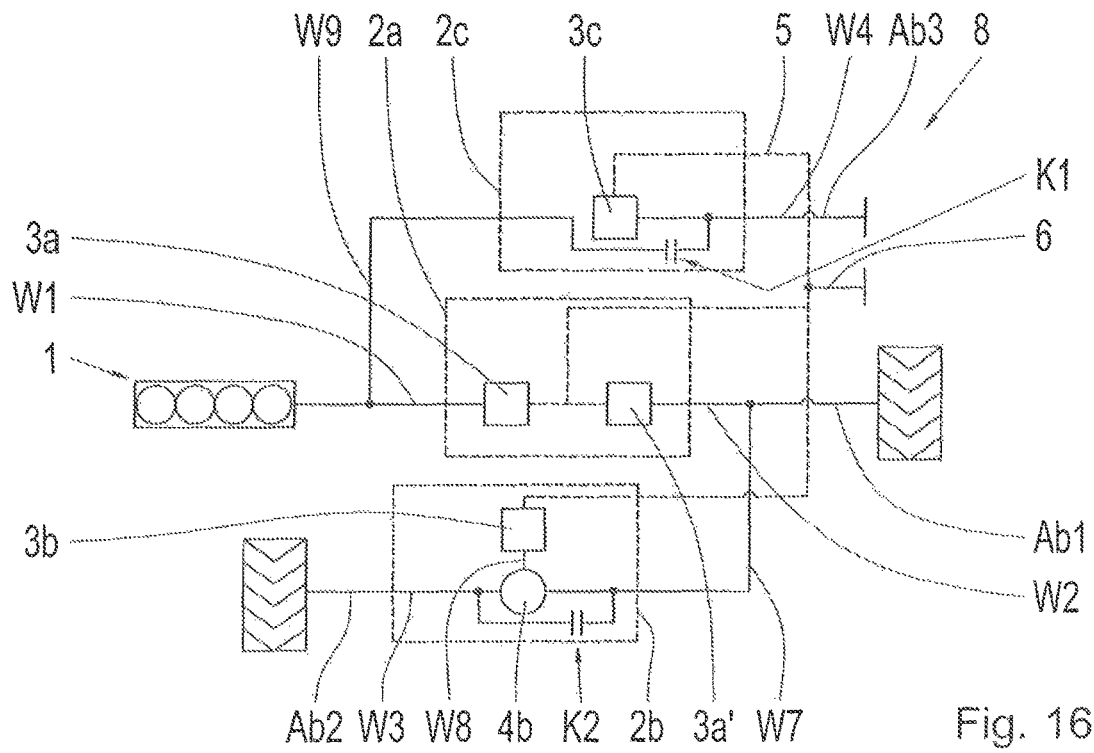
FIG. 16: A schematic representation of a sixteenth embodiment of a power-split drive train according to the invention.

FIG. 16 shows a schematic representation of a sixteenth embodiment of the power-split drive train 1. This differs from the embodiment shown in FIG. 13 essentially in the design of the first additional drive unit 2a. The two energy converters 3a, 3a' of the first additional drive unit 2a are connected to one another only by the line 5, the first energy converter 3a of the first additional drive unit 2a is connected to the first shaft W1 and the second energy converter 3a' of the first additional drive unit 2a is connected to the second shaft W2. Thus, the two energy converters 3a, 3a' of the first additional drive unit 2a are not connected to one another by shafts and/or planetary gearsets. In other respects the embodiment shown in FIG. 16 corresponds to the embodiment described in FIG. 13.

FIG. 17 shows a shifting matrix for the power-split drive trains according to the invention represented in FIGS. 1 to 8. Vertically downward, six different shifting conditions S1 to S6 are shown. Horizontally to the right, the respective shifting elements K1, K2, B1 are shown. The cells left empty in the shifting matrix indicate that the corresponding shifting element K1, K2, B1 is open, i.e. that the shifting element K1, K2, B1 is not transmitting any force or torque. A cell of the shifting matrix containing a cross indicates that the corresponding shifting element K1, K2, B1 is actuated or closed.

Below, three different CVT structures for the first drive output shaft Ab1 are explained. An 'input-coupled' CVT structure for the first drive output shaft Ab1 is understood to mean that the first additional drive unit 2a has a fixed rotational speed ratio on the input side. Furthermore, an 'output-coupled' CVT structure for the first drive output shaft Ab1 is understood to mean that the first additional drive unit 2a has a fixed rotational speed ratio on the output side. An 'input-output-coupled' CVT structure for the first drive output shaft Ab1 is understood to mean that the first additional drive unit 2a has a fixed rotational speed ratio on the input and on the output side. Thus, an energy converter 3a, 3a' of the first additional drive unit 2a is connected in a rotationally fixed manner both to the main drive element 1 and to the first drive output shaft Ab1.

To obtain the first shifting condition S1 by means of the power-split drive train shown in FIGS. 1 to 8, the shifting element K1 is closed and the two shifting elements B1 and K2 are open. This allows rotational speed variability for the first and second drive output shafts Ab1, Ab2. In the power-split drive trains shown in FIGS. 2 and 6, for the first drive output shaft Ab1 the first shifting condition S1 produces the input-coupled CVT structure and the input-output-coupled CVT structure. Furthermore, in the power-split drive trains shown in FIGS. 3 and 7, for the first drive output shaft Ab1 the first shifting condition S1 produces the input-coupled CVT structure.

To obtain the second shifting condition S2 by means of the power-split drive train shown in FIGS. 1 to 8, the two shifting elements K1 and K2 are closed and the shifting element B1 is open. This enables rotational speed variability for the first drive output shaft Ab1. In the power-split drive trains shown in FIGS. 1 and 5, for the first drive output shaft Ab1 the second shifting condition S2 produces the output-coupled CVT structure and the input-output-coupled CVT structure. In the power-split drive trains shown in FIGS. 2 and 6, for the first drive output shaft Ab1 the second shifting condition S2 produces the input-coupled CVT structure and the input-output-coupled CVT structure. Furthermore, in the power-split drive trains shown in FIGS. 3 to 7, for the first drive output shaft Ab1 the second shifting condition S2 produces the input-coupled CVT structure, the output-coupled CVT structure and the input-output-coupled CVT structure.

To obtain the third shifting condition S3 by means of the power-split drive train shown in FIGS. 1 to 8, the shifting element B1 is closed and the two shifting elements K1 and K2 are open. This enables rotational speed variability for the first and second drive output shafts Ab1, Ab2. In the power-split drive trains shown in FIGS. 2 and 6, for the first drive output shaft Ab1 the third shifting condition S3 produces the input-coupled CVT structure and the input-output-coupled CVT structure. Furthermore, in the power-split drive trains shown in FIGS. 3 and 7, for the first drive output shaft Ab1 the third shifting condition S3 produces the input-coupled CVT structure.

To obtain the fourth shifting condition S4 by means of the power-split drive train shown in FIGS. 1 to 8, the two shifting elements B1 and K2 are closed and the shifting element K1 is open. This enables rotational speed variability for the first drive output shaft Ab1. In the power-split drive trains shown in FIGS. 1 and 5, for the first drive output shaft Ab1 the fourth shifting condition S4 produces the output-coupled CVT structure and the input-output-coupled CVT structure. In the power-split drive trains shown in FIGS. 2 and 6, for the first drive output shaft Ab1 the fourth shifting condition S4 produces the input-coupled CVT structure and the input-output-coupled CVT structure. Furthermore, in the power-split drive trains shown in FIGS. 3 and 7, the fourth shifting condition S4 produces the input-coupled CVT structure, the output-coupled CVT structure and the input-output-coupled CVT structure.

To obtain the fifth shifting condition S5 by means of the power-split drive train shown in FIGS. 1 to 8, the shifting element K2 is closed and the two shifting elements K1 and B1 are open. This enables rotational speed variability for the first and third drive output shafts Ab1, Ab3. In the power-split drive trains shown in FIGS. 1 and 5, for the first drive output shaft Ab1 the fifth shifting condition S5 produces the output-coupled CVT structure and the input-coupled CVT structure. Furthermore, in the power-split drive trains shown in FIGS. 3 and 7, for the first drive output shaft Ab1 the fifth shifting condition S5 produces the output-coupled CVT structure.

To obtain the sixth shifting condition S6 by means of the power-split drive trains shown in FIGS. 1 to 8, all three shifting elements K1, K2 and B1 are open. This enables rotational speed variability for all three drive output shafts Ab1, Ab2, Ab3.

FIG. 18 shows a shifting matrix for the power-split drive trains shown in FIGS. 9 to 16. Vertically downward are shown four different shifting conditions S1 to S4. Horizontally to the right the two shifting elements K1 and K2 are shown. The empty cells in the matrix indicate that the corresponding shifting element K1, K2 is open, i.e. that the shifting element K1, K2 does not transmit any force or torque. A shifting matrix cell with a cross in it indicates that the shifting element K1, K2 is actuated or closed.

To obtain the first shifting condition S1 by means of the power-split drive trains shown in FIGS. 9 to 16, the shifting element K1 is closed and the shifting element K2 is open. This enables rotational speed variability for the first and second drive output shafts Ab1, Ab2. In the power-split drive trains shown in FIGS. 10 and 14, for the first drive output shaft Ab1 the first shifting condition S1 produces the input-coupled CVT structure and the input-output-coupled CVT structure. Furthermore, in the power-split drive trains shown in FIGS. 11 and 15, for the first drive output shaft Ab1 the first shifting condition S1 produces the input-coupled CVT structure.

To obtain the second shifting condition S2 by means of the power-split drive trains shown in FIGS. 9 to 16, the shifting elements K1 and K2 are both closed. This enables rotational speed variability for the first drive output shaft Ab1. In the power-split drive trains shown in FIGS. 9 and 13, for the first drive output shaft Ab1 the second shifting condition S2 produces the output-coupled CVT structure and the input-output-coupled CVT structure. In the power-split drive trains shown in FIGS. 10 and 14, for the first drive output shaft Ab1 the second shifting condition S2 produces the input-coupled CVT structure and the input-output-coupled CVT structure. In addition, in the power-split drive trains shown in FIGS. 11 and 15, for the first drive output shaft Ab1 the second shifting condition S2 produces the input-coupled CVT structure, the output-coupled CVT structure and the input-output-coupled CVT structure.

To obtain the third shifting condition S3 by means of the power-split drive trains shown in FIGS. 9 to 16, the shifting element K2 is closed and the shifting element K1 is opened. This enables rotational speed variability for the first and third drive output shafts Ab1, Ab3. In the power-split drive trains shown in FIGS. 9 and 13, for the first drive output shaft Ab1 the third shifting condition S3 produces the output-coupled CVT structure and the input-output-coupled CVT structure. Furthermore, in the power-split drive trains shown in FIGS. 11 and 15, for the first drive output shaft Ab1 the third shifting condition S3 produces the output-coupled CVT structure.

To obtain the fourth shifting condition S4 by means of the power-split drive trains shown in FIGS. 9 to 16. Both of the shifting elements K1 and K2 are opened. This enables rotational speed variability for all three of the drive output shafts Ab1, Ab2 and Ab3.

It should be pointed out that the embodiments of the power-split drive trains with which no CVT structure is associated do not form any CVT structure. For example, the embodiments of the power-split drive trains shown in FIGS. 4, 8, 12 and 16 do not produce a CVT structure in any shifting condition.

The invention is not limited to the example embodiments described above. In particular by omitting shifting elements and accordingly omitting shifting conditions, the respective power-split drive trains according to the invention can be simplified.

Alternatively, the first shifting element K1 of the third additional drive unit 2c shown in FIG. 1 can be arranged between the ninth shaft W9 and the tenth shaft W10. Moreover, the shifting element K2 of the second additional drive unit 2b can alternatively be arranged between the third shaft W3 and the eighth shaft W8.

In the present case the control units for the control and regulation systems for the energy converters 3a, 3a', 3b, 3c have not been shown in the figures. In further developments of the embodiments according to the invention further shiftable and/or non-shiftable transmission stages can be connected upstream and/or downstream.

In an embodiment, the third additional drive unit 2c shown in FIGS. 1 to 8 comprises the first shifting element K1 and the second shifting element B1 is omitted. Thus, all the shifting conditions in which B1 is closed are unavailable. Also preferably, the third additional drive unit 2c comprises the second shifting element B1 while the first shifting element K1 is omitted. Thus, all the shifting conditions in which K1 is closed are unavailable. The closing of the shifting element B1 can in particular produce a preferred rotational speed level of the energy converter 3c, such that a rotational speed is increased and a torque is reduced. Closing the shifting element B1 brings the third drive output shaft Ab3 to rest.

Also preferably, the third additional drive unit 2c shown in FIGS. 9 to 16 comprises the first shifting element K1. Moreover, however, it is also conceivable to omit the first shifting element K1 and then the fourth shaft W4 is connected rotationally fixed to, or made integrally with the ninth shaft W9. All the shifting conditions in which K1 is open are then unavailable.

Preferably, the second additional drive unit 2b shown in FIGS. 5 to 8 and 13 to 16 comprises the shifting element K2. Furthermore, however, it is also conceivable to omit the shifting element K2 and then the third shaft W3 is connected rotationally fixed to, or made integrally with the seventh shaft W7. All the shifting conditions in which K2 is open are then unavailable.

Also preferably, the second additional drive unit 2b shown in FIGS. 1 to 4 and 9 to 12 comprises the shifting element K2. Moreover, however, it is also conceivable to omit the shifting element K2 and to connect the third shaft W3 rotationally fixed to or make it integrally with the seventh shaft W7. All the shifting conditions in which K2 is open are then unavailable. Furthermore it is conceivable to omit the seventh shaft W7, and then the energy converter 3b is connected by way of the third shaft W3 to the second drive output shaft Ab2 and by way of the electric line 5 to the respective energy converter 3a, 3a' and 3c of the first and third additional drive unit 2a, 2c concerned. All the shifting conditions in which K2 is closed are then unavailable.

The example embodiments described enable various operating modes with fully or partially continuous drive for the respective drive output shafts Ab1, Ab2, Ab3. An advantage of the example embodiments shown is the very small number of only four energy converters 3a, 3a', 3b, 3c needed, which among other things makes it possible to produce a compactly built and cost-optimized power-split drive train. Owing to the multiple use and synergetic interplay of the three additional drive units 2a, 2b, 2c, depending on the shifting condition three rotation-speed-variable drive output shafts Ab1, Ab2, Ab3 are available.

INDEXES

1 Main drive element
2a First additional drive unit
2b Second additional drive unit
2c Third additional drive unit
3a First energy converter of the first additional drive unit
3a' Second energy converter of the first additional drive unit
3b Energy converter of the second additional drive unit
3c Energy converter of the third additional drive unit
4a First planetary gearset of the first additional drive unit
4a' Second planetary gearset of the first additional drive unit
4b Planetary gearset of the second additional drive unit
4c Planetary gearset of the third additional drive unit
5 Electric line
6 Interface
7 Housing
8 Continuous power-split transmission
9 Energy storage device
Ab1 First drive output shaft
Ab2 Second drive output shaft
Ab3 Third drive output shaft
K1 First shifting element of the third additional drive unit B1 Second shifting element of the third additional drive unit
K2 Shifting element of the second additional drive unit
W1 First shaft
W2 Second shaft
W3 Third shaft
W4 Fourth shaft
W5 Fifth shaft
W6 Sixth shaft
W7 Seventh shaft
W8 Eighth shaft
W9 Ninth shaft
W10 Tenth shaft
W5' Eleventh shaft
W6' Twelfth shaft
S1 First shifting condition
S2 Second shifting condition
S3 Third shifting condition
S4 Fourth shifting condition
S5 Fifth shifting condition
S6 Sixth shifting condition

The invention claimed is:

1. A power-split drive train for a working machine, the power-split drive train comprising:
a main drive element,
first, second and third rotational-speed-variable drive output shafts,
a continuous power-split transmission having first, second and third additional drive units,
the transmission being arranged so as to enable rotational speed variability at the first, the second and the third drive output shafts, such that all of the first, the second and the third drive output shafts can be operated simultaneously in a rotational-speed-variable manner,
the first additional drive unit comprises first and second energy converters, and
the second and the third additional drive units each comprise one energy converter,
the four energy converters of the first, the second and the third additional drive units being functionally connected to one another at least by an electric line,
the main drive element being connected to the first additional drive unit by a first shaft and the first drive output shaft being connected to the first additional drive unit by a second shaft,
the first additional drive unit being at least indirectly connected to the second additional drive unit and being connected, by the second additional drive unit and a third shaft, to the second drive output shaft, and
the first additional drive unit being at least indirectly connected to the third additional drive unit and being connected by way of the third additional drive unit and a fourth shaft to the third drive output shaft.

2. The power-split drive train according to claim 1, wherein the first additional drive unit, in addition to the first and second energy converters, also comprises a second planetary gearset, and the second energy converter is connected by a fifth shaft to the second planetary gearset of the first additional drive unit, the first energy converter of the first additional drive unit is connected by a sixth shaft to the first shaft, and the first and the second shafts are connected to the second planetary gearset of the first additional drive unit.

3. The power-split drive train according to claim 1, wherein the first additional drive unit, in addition to the first and the second energy converters, also comprises a first planetary gearset, and the first energy converter of the first additional drive unit is connected by a sixth shaft to the first planetary gearset of the first additional drive unit, the second energy converter of the first additional drive unit is connected by a fifth shaft to the second shaft, and the first and the second shafts are connected to the first planetary gearset of the first additional drive unit.

4. The power-split drive train according to claim 1, wherein the first additional drive unit, in addition to the first and the second energy converters, comprises a first and a second planetary gearset and the second energy converter of the first additional drive unit is connected by a fifth shaft to the second planetary gearset of the first additional drive unit, the first energy converter of the first additional drive unit is connected by a sixth shaft to the first planetary gearset of the first additional drive unit, the first shaft is connected to the first planetary gearset of the first additional drive unit, the second shaft is connected to the second planetary gearset of the first additional drive unit, the first planetary gearset of the first additional drive unit is connected by a twelfth shaft to either the fifth shaft or the second shaft, and the second planetary gearset of the first additional drive unit is connected by an eleventh shaft to either the sixth shaft or the first shaft.

5. The power-split drive train according to claim 1, wherein the first and the second energy converters of the first additional drive unit are connected to one another only by the electric line, the first energy converter of the first additional drive unit is connected to the first shaft and the second energy converter of the first additional drive unit is connected to the second shaft.

6. The power-split drive train according to claim 1, wherein the energy converter of the second additional drive unit is connected by the third shaft to the second drive output shaft.

7. The power-split drive train according to claim 6, wherein the seventh shaft and the third shaft are couplable to one another by a shifting element of the second additional drive unit.

8. The power-split drive train according to claim 1, wherein the second additional drive unit, in addition to the energy converter, also comprises a planetary gearset, and the energy converter of the second additional drive unit is connected by an eighth shaft to the planetary gearset of the second additional drive unit, the second drive output shaft is connected by the third shaft to the planetary gearset of the second additional drive unit, and a seventh shaft, connected to the second shaft, is connected to the planetary gearset of the second additional drive unit.

9. The power-split drive train according to claim 1, wherein the energy converter of the third additional drive unit is connected by the fourth shaft to the third drive output shaft.

10. The power-split drive train according to claim 1, wherein the third additional drive unit, in addition to the energy converter, also comprises a planetary gearset, and the energy converter of the third additional drive unit is connected by a tenth shaft to the planetary gearset of the third additional drive unit, the third drive output shaft is connected by the fourth shaft to the planetary gearset of the third additional drive unit, and a ninth shaft, connected to the first shaft, is connected to the planetary gearset of the third additional drive unit.

11. The power-split drive train according to claim 10, wherein the ninth shaft and the fourth shaft are couplable to one another by a first shifting element of the third additional drive unit.

12. The power-split drive train according to claim 10, wherein the fourth shaft is connectable, in a rotationally fixed manner, to a housing by a second shifting element of the third additional drive unit.

13. The power-split drive train according to claim 1, wherein the electric line is at least indirectly connected to an energy storage device.

14. The power-split drive train according to claim 1, wherein the four energy converters of the first, the second and the third additional drive units are designed to operate electrically, and the electric line has an interface for at least one of delivery and uptake of electric power.

15. A working machine in combination with a power-split drive-train, the power-split drive train comprising:
   a main drive element,
   first, second and third rotational-speed-variable drive output shafts,
   a continuous power-split transmission with first, second and third additional drive units,
   the transmission being arranged so as to enable rotational speed variability at the first, the second and the third drive output shafts such that all of the first, the second and the third drive output shafts can be simultaneously operated in a rotational-speed-variable manner,
   the first additional drive unit comprising first and second energy converters,
   the second and the third additional drive units each comprise one energy converter,
   the four energy converters of the first, the second and the third additional drive units being functionally connected to one another at least by an electric line,
   the main drive element being connected to the first additional drive unit by a first shaft and the first drive output shaft being connected to the first additional drive unit by a second shaft,
   the first additional drive unit being at least indirectly connected to the second additional drive unit and being connected, by the second additional drive unit and a third shaft, to the second drive output shaft, and
   the first additional drive unit being at least indirectly connected to the third additional drive unit and being connected, by the third additional drive unit and a fourth shaft, to the third drive output shaft.

* * * * *